(No Model.)
H. E. KELLEY.
COW TIE.
No. 469,254. Patented Feb. 23, 1892.
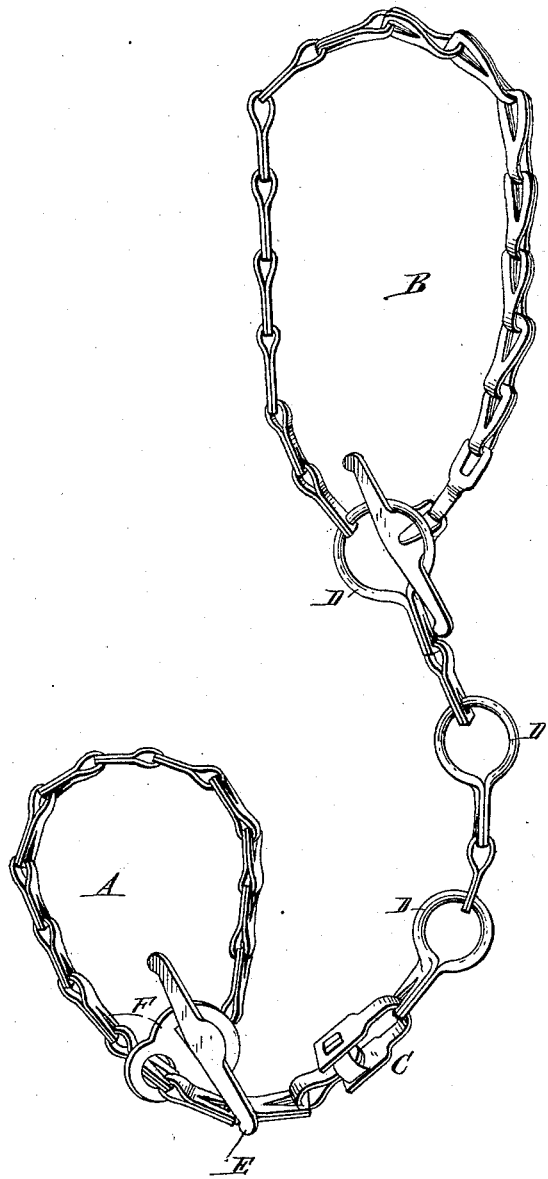
Witnesses:
Emil Neuhart.
Theo. L. Popp.
H. E. Kelley Inventor.
By Wilhelm & Bonner
Attorneys.

UNITED STATES PATENT OFFICE.

HARRY E. KELLEY, OF NIAGARA FALLS, ASSIGNOR TO THE ONEIDA COMMUNITY, LIMITED, OF KENWOOD, NEW YORK.

COW-TIE.

SPECIFICATION forming part of Letters Patent No. 469,254, dated February 23, 1892.

Application filed April 25, 1891. Serial No. 390,380. (No model.)

*To all whom it may concern:*

Be it known that I, HARRY E. KELLEY, a citizen of the United States, residing at Niagara Falls, in the county of Niagara and State of New York, have invented new and useful Improvements in Cow-Ties, of which the following is a specification.

This invention relates to the class of animal-chains known as "cow-ties."

Previous to my invention these cow-ties were composed of three separate strands or members united at their inner portions by a swivel. One of the strands was employed for fastening the tie to a post or other object, while the other two strands were connected together to form a noose, which surrounded the animal's neck. Farmers and others who purchase cow-ties have occasional use for an ordinary chain, and it is desirable that the cow-tie should be so constructed that it may be used for the purposes of an ordinary continuous chain.

My invention has the objects to so construct the chain that it may be used either as a cow-tie or as an ordinary chain and to render the same more convenient of adjustment and less annoying to the animal.

The accompanying drawing represents a perspective view of my improved cow-tie.

My improved cow-tie consists of two parts or members A B, which are connected at their inner ends by a swivel C, of any desired construction. The member A is somewhat shorter than the member B, and is employed for attaching the tie to a post or other object, while the longer member is passed around the animal's neck.

The long member B is provided at its free outer end with a snap-hook or cross-bar, which is designed to be interlocked with one of several rings or enlarged links D, arranged on said member near the swivel C, so as to form a loop or noose, which surrounds the neck of the animal. The member B is provided with two or more rings D to permit a larger or smaller noose to be formed, according to the size of the animal.

The short member A is provided at its free outer end with a toggle or cross-bar E, which is designed to engage with a sliding ring F, arranged upon said short member, so as to form a noose or loop of variable size for attaching the cow-tie to a post or other object. This sliding ring is provided with two openings, one through which the member A of the chain passes and the other for receiving the toggle E. In applying the cow-tie its long member B is passed around the animal's neck and its snap-hook or cross-bar at the free end of the member is interlocked with one of the stationary rings or enlarged links D. The short member A is then passed around the post or other object, its cross-bar is engaged with the sliding ring F, and the noose so formed is drawn tightly about the post.

In cow-ties as heretofore constructed the ring and the snap-hook or toggle of the noose are located at the upper part of the animal's neck, where they are inconvenient and cause the links of the chain to lie edgewise and unduly chafe the animal. In my improved tie these connections are below the animal's neck near the swivel, where they permit the noose to be more conveniently adjusted and allow the chain-links to lie with their flat sides against the animal's neck, thereby rendering the chain less annoying to the animal.

Upon disconnecting the snap-hook or cross-bar of the long member of the cow-tie from the ring D and disengaging the cross-bar of the short member from the sliding ring F, a continuous chain of the combined length of the two members A and B is obtained, which may be used for the various purposes of an ordinary chain.

My improved cow-tie is more desirable and convenient than those heretofore employed, and to persons who desire a cow-tie and also have occasional use for an ordinary chain it saves the expense of a separate chain. If desired, the long member of the cow-tie may be provided with a snap-hook instead of a cross-bar.

I claim as my invention—

A cow-tie consisting of two strands or members connected together at their inner ends by a swivel and forming a continuous chain, one member being provided at its free end with a toggle or snap-hook and between said swivel and the toggle or snap-hook with a sliding ring having two openings, one for receiving the chain and the other for receiving said toggle or snap-hook, and the other member being provided at its free end with a toggle or snap-hook and between the latter toggle or snap-hook and the swivel with one or more rings, with either of which said toggle or snap-hook interlocks, substantially as set forth.

Witness my hand this 7th day of April, 1891.

HARRY E. KELLEY.

Witnesses:
FRED. C. GEYER,
THEO. L. POPP.